Dec. 11, 1962 T. D. FOSTER 3,068,052
SPRING LOADED TABLE BALL BEARINGS
Filed Oct. 19, 1960 2 Sheets-Sheet 1
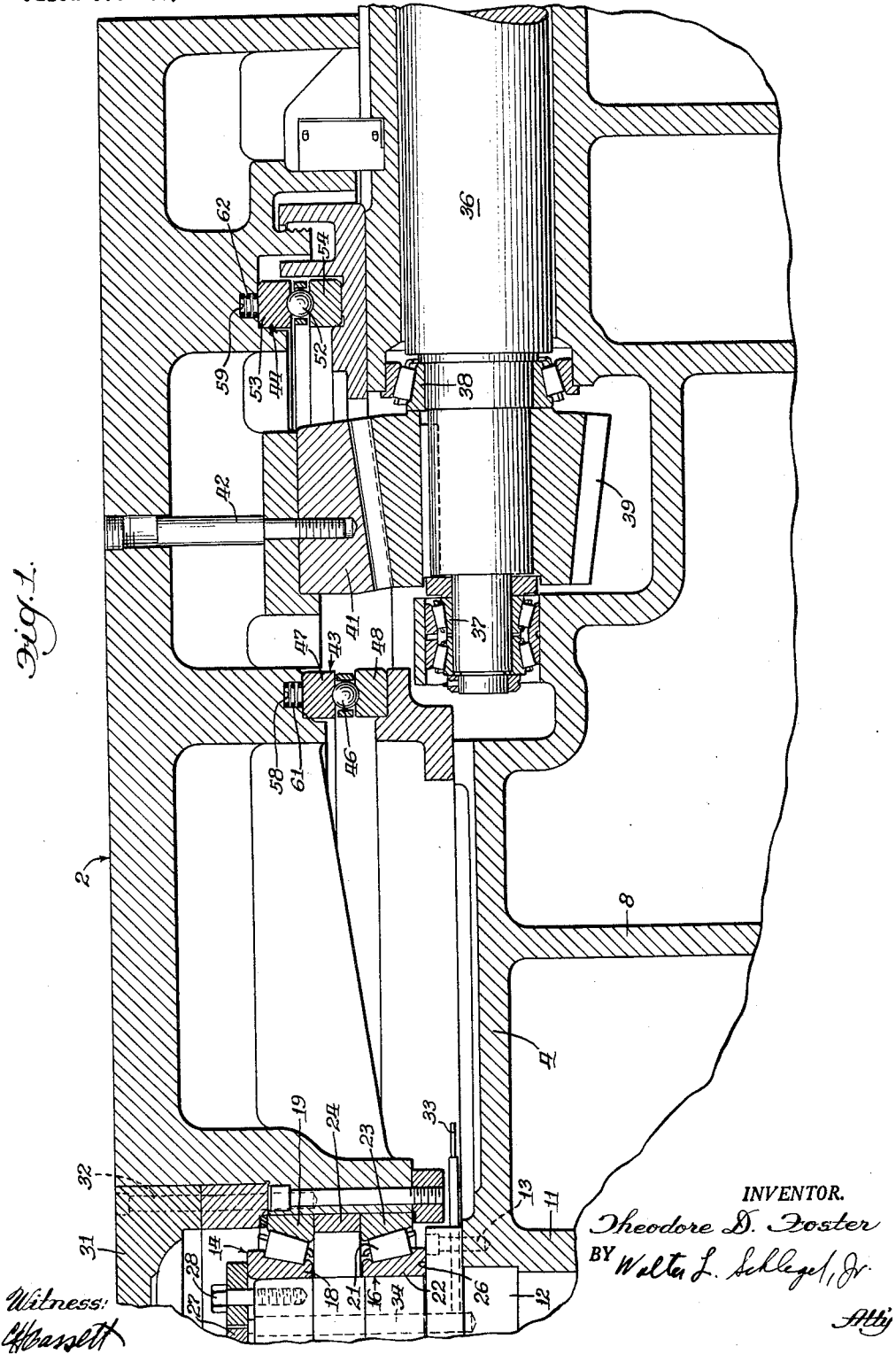
INVENTOR.
Theodore D. Foster
BY Walter L. Schlegel, Jr.
Atty
Witness:
C. H. Bassett

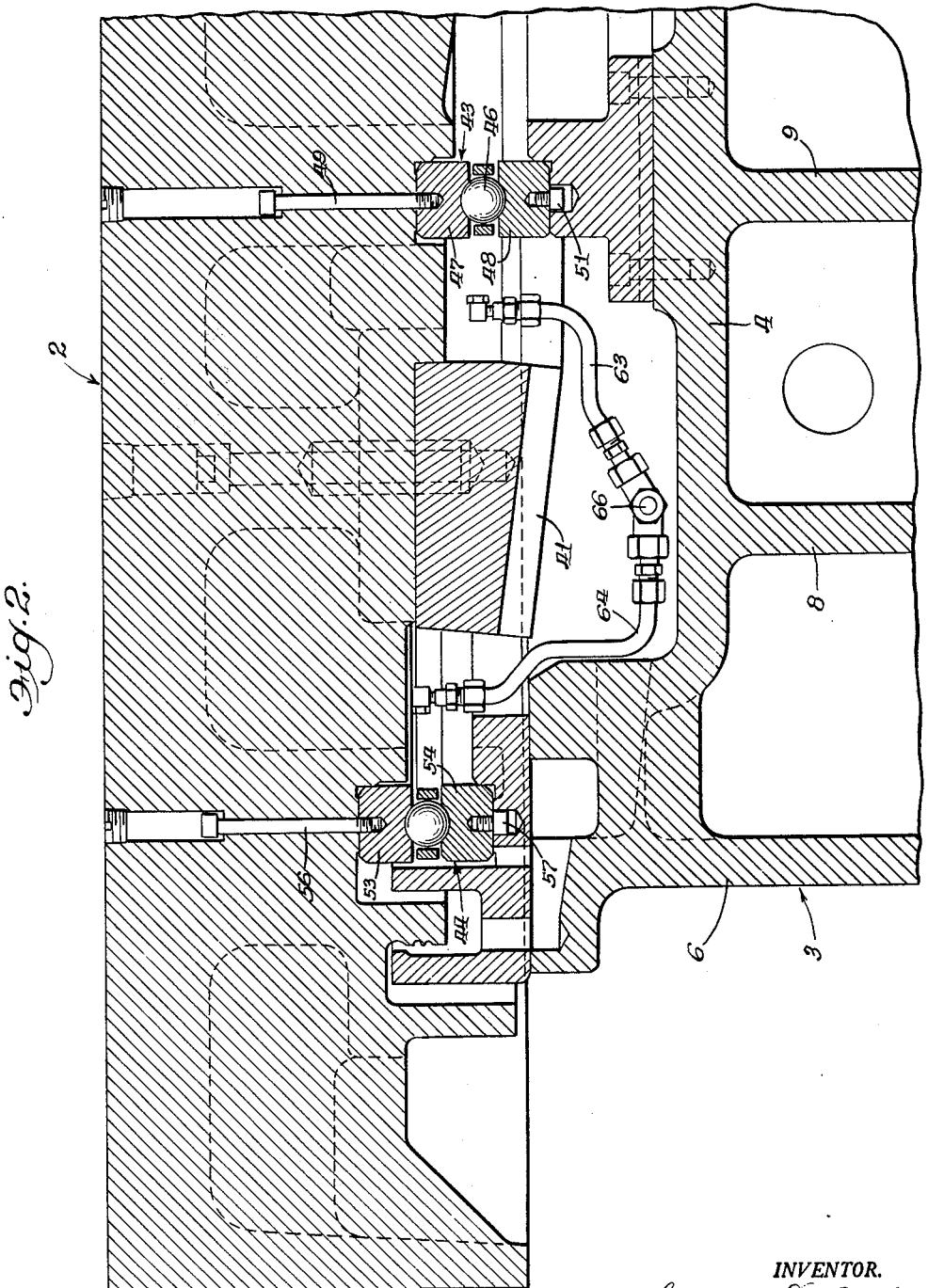

3,068,052
SPRING LOADED TABLE BALL BEARINGS
Theodore D. Foster, Montgomery, Ohio, assignor, by mesne assignments, to The G. A. Gray Company, Cincinnati, Ohio, a corporation of Ohio
Filed Oct. 19, 1960, Ser. No. 63,662
6 Claims. (Cl. 308—227)

This invention relates to vertical boring mills and more particularly to means for supporting a boring mill table for rotational movement.

Some vertical boring mills now in use are provided with large diameter tables for supporting heavy workpieces during various machining operations. To reduce friction, it is desirable to support the table for rotation upon a plurality of sets of antifriction ball bearings comprising steel balls engaged between upper and lower races. During machining of heavy workpieces weighing thousands of pounds, the table may be distorted a few thousandths of an inch and cause the load to be removed from one of the sets of balls, whereby the balls fail to roll properly between their races. It will be understood that antifriction ball bearings must be operated under load to prevent sliding, erratic tracking, ball chatter, impacting, and rapid bearing failure.

It is, therefore, an object of the invention to provide a vertical boring mill provided with a table rotatably supported upon concentric sets of antifriction ball bearings.

Another object of the invention resides in the provision of means for spring loading each set of antifriction ball bearings to insure proper rolling action of the balls between their respective races, to thereby prevent rapid bearing failure due to sliding of the balls between the races.

The invention embodies other novel features, details of construction and arrangement of parts which are hereinafter set forth in the specification and claims and illustrated in the accompanying drawings, forming part thereof, wherein:

FIGURE 1 is a transverse fragmentary section illustrating a boring mill table supporting means embodying features of the invention.

FIGURE 2 is a fragmentary detail section showing the table supporting means.

Referring now to the drawings for a better understanding of the invention, a portion of a vertical boring mill is shown as comprising a work supporting table 2 mounted for rotational and nonaxial movement upon a base 3.

The base 3 is shown as comprising a metal casting having a top wall 4, a side wall 6, a bottom wall 7, and vertical partitions 8 and webs 9 serving to reinforce the top wall. The base is also provided with a tubular column 11 extending centrally between the top and bottom walls to receive and support a stud shaft 12 which is secured to the base by cap screws 13.

Two antifriction bearings 14 and 16 are mounted on the shaft 12 to support the table 2 for rotational movement about a vertical axis. The upper bearing 14 comprises tapered rollers 17 engaged between inner and outer races 18 and 19; and the lower bearing comprises tapered rollers 21 engaged between inner and outer races 22 and 23. A spacing sleeve 24 is interposed between the outer races 19 and 23. The inner race 22 is engaged against a shoulder 26 on the shaft 12, and the inner race 18 is engaged by a plate 27 secured to the shaft by cap screws 28.

The outer races 19 and 23 are snugly mounted in a central bore 29 formed in the table 2 and engaged against upward movement by a cover 31 secured to the table by cap screws 32. A suitable lubricant is adapted to be supplied to the bearings through a conduit 33 and a passage 34 leading through the shaft 12 and plate 27 to the interior of the cover 31.

A drive shaft 36 is journaled in antifriction bearings 37 and 38 mounted on the base 3 and has a bevel gear 39 keyed thereon for meshing engagement with a ring gear 41 secured against the lower surface of the table 2 by cap screws 42. The shaft 36 is driven by an electric motor provided with a reduction gear unit.

The table 2 is shown as supported for rotational movement upon two sets of antifriction ball bearings 43 and 44 engaged between the table and the base 3 and disposed concentric with the stud shaft 12. The inner antifriction bearing 43 comprises a set of balls 46 engaged between upper and lower races 47 and 48, the upper race 47 being secured to the table 2 by cap screws 49, and the lower race 48 being engaged against movement relative to the base 3 by means of studs 51.

The outer antifriction bearing 44 comprises a set of balls 52 engaged between upper and lower races 53 and 54, the upper race 53 being secured to the table 2 by cap screws 56, and the lower race 54 being fixed on the base 3 by means of studs 57. As shown in the drawings, the diameter of the inner bearing 43 is approximately one half (½) the diameter of the table 2, and the diameter of the outer bearing 44 is. approximately seven ninths (⅞) the diameter of the table.

While the inner and outer sets of antifriction bearings 43 and 44 are provided to coact in supporting the table, it will be understood that the table must support heavy workpieces of various shapes and sizes and may, therefore, flex and become distorted a few thousandths of an inch during a machining operation, thereby causing one bearing to run with clearance between the balls and its races.

As heretofore pointed out, the antifriction ball bearings must be operated under load conditions to prevent erratic tracking, sliding and scuffing, chattering, impacting, and bearing failure. To maintain the antifriction bearings in a loaded condition, regardless of flexure or distortion of the table during machining of heavy workpieces, two groups of spring pockets 58 and 59 are provided in the bottom of the table 2 and above the upper races 47 and 53 to receive helical compression springs 61 and 62 to engage and bias the upper races 47 and 53 toward their respective lower races.

To insure proper rolling action of the balls between their respective races, twelve springs exerting a total force of 1200 pounds are equidistantly spaced above the upper race 43, and 20 springs exerting a total force of 2000 pounds are equidistantly spaced above the upper race 53. It will be noted that the cap screws 49 and 56 are adapted to permit limited axial movement of their respective upper races 47 and 53 away from the table 2.

Lubricant is supplied to the antifriction ball bearings 43 and 44 from pipes 63 and 64 connected to a common header 66 leading from a supply tank.

Heretofore, when the table 2 was flexed or distorted due to the weight of heavy workpieces mounted thereon, one of the upper races 47 and 53 would move away from its respective lower race and permit their related balls to slide and scuff the races.

In the present invention, it will be noted that the compression springs 61 and 62 will always exert sufficient force against their upper races 47 and 53 to maintain the balls in rolling engagement between their races, regardless of flexure or distortion of the table, thereby materially increasing the useful life of the bearings.

While the invention has been shown in but one form, it is obvious to those skilled in the art that it is not so limited, but is susceptible of various changes and modifications without departing from the scope of the claims.

I claim:
1. In a vertical boring mill, a base, a table journaled on said base for rotational movement about a vertical axis, anti-friction ball bearings of different diameters mounted on said base concentric with said axis to support said table, each bearing comprising upper and lower races with balls engaged therebetween, and resilient means on said table urging each upper race toward its respective lower race, whereby said bearings are always operated under a loaded condition when said table is distorted during loading of a workpiece thereon, said table having a surface formed thereon engageable with said upper race to limit its upward movement against said resilient means.

2. In a vertical boring mill, a base, a table journaled on said base for rotational movement about a vertical axis, anti-friction ball bearings of different diameters mounted on said base concentric with said axis to support said table, each bearing comprising upper and lower races with balls engaged therebetween, and resilient means urging related races toward each other to provide a loaded condition for each bearing in the event of distortion of the table due to mounting of a workpiece thereon, said table having a surface formed thereon engageable with said upper race to limit its upward movement against said resilient means.

3. In a vertical boring mill, a base, a table journaled on said base for rotational movement about a vertical axis, anti-friction ball bearings of different diameters mounted on said base concentric with said axis to support said table, each bearing comprising upper and lower races with balls engaged therebetween, and resilient means on said table urging each upper race toward its respective lower race, whereby said bearings are always operated under a loaded condition when said table is distorted during loading of a workpiece thereon, said resilient means comprising concentric groups of circumferentially spaced helical compression springs seated on said table and engaging their respective upper races, said table being journaled on anti-friction tapered roller bearings provided on said base.

4. In a vertical boring mill, a base, a table journaled on said base for rotational movement about a vertical axis, anti-friction ball bearings of different diameters mounted on said base concentric with said axis to support said table, each bearing comprising upper and lower races with balls engaged therebetween, and resilient means on said table urging each upper race toward its respective lower race, whereby said bearings are always operated under a loaded condition when said table is distorted during loading of a workpiece thereon, guide means on said table engaging said upper races for axial and non-rotational movement relative to the table, and means engaging said lower races against rotational movement relative to said base.

5. In a vertical boring mill, a base, a table journaled on said base for rotational movement about a vertical axis, anti-friction ball bearings of different diameters mounted on said base concentric with said axis to support said table, each bearing comprising upper and lower races with balls engaged therebetween, said lower races being fixed to said base means retaining said upper races on the underside of said table with limited freedom of axial movement with respect to said table and resilient means on said table urging each upper race toward its respective lower race whereby said bearings are always operated under a loaded condition when the table is distorted during loading of a workpiece thereon said table having surfaces formed thereon engageable with said upper races to limit their upper movement against said resilient means, and guide means on said table engaging said upper races for axial and non-rotational movement relative to the table.

6. In a vertical boring mill, a base, a table journaled on said base for rotational movement about a vertical axis, anti-frictional ball bearings of different diameters mounted on said base concentric with said axis to support said table, each bearing comprising upper and lower races with balls engaged therebetween, said upper races being secured to said table by a plurality of cap screws of a length permitting limited axial movement of the respective upper races from said table, and resilient means on said table urging each upper race toward its respective lower race, whereby said bearings are always operated under a loaded condition when said table is distorted during loading of a workpiece thereon, said resilient means comprising concentric groups of circumferentially spaced helical compressing springs seated on said table and engaging their respective upper races, said table having means formed thereon engageable with said upper races to limit their upward movement against said compression springs.

References Cited in the file of this patent
UNITED STATES PATENTS

| | | |
|---|---|---|
| 706,088 | McCornack | Aug. 5, 1902 |
| 2,648,139 | Wilkerson | Aug. 11, 1953 |
| 2,673,768 | Douglas | Mar. 30, 1954 |
| 2,773,725 | Roberts | Dec. 11, 1956 |
| 2,783,687 | Roberts | Mar. 5, 1957 |